US009532220B2

(12) United States Patent
Lee et al.

(10) Patent No.: US 9,532,220 B2
(45) Date of Patent: Dec. 27, 2016

(54) APPARATUS AND METHOD FOR AUTHENTICATION IN WIRELESS COMMUNICATION SYSTEM

(71) Applicant: Samsung Electronics Co., Ltd., Gyeonggi-do (KR)

(72) Inventors: Duckey Lee, Seoul (KR); Bo-Gyeong Kang, Seoul (KR); Jung-Je Son, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/669,706

(22) Filed: Mar. 26, 2015

(65) Prior Publication Data
US 2015/0281961 A1    Oct. 1, 2015

(30) Foreign Application Priority Data

Mar. 26, 2014    (KR) ........................ 10-2014-0035355

(51) Int. Cl.
*H04M 1/68*    (2006.01)
*H04W 12/06*    (2009.01)
(Continued)

(52) U.S. Cl.
CPC ............. *H04W 12/06* (2013.01); *H04W 12/04* (2013.01); *H04L 63/0869* (2013.01); *H04L 63/18* (2013.01)

(58) Field of Classification Search
CPC ... H04W 12/06; H04W 12/04; H04L 63/0869; H04L 63/18
(Continued)

(56) References Cited

U.S. PATENT DOCUMENTS 8,589,689 B2 * 11/2013 Palanigounder .... H04L 63/0884
                                                       713/150
8,775,795 B2 *  7/2014 Que ........................ H04L 63/08
                                                       380/247
(Continued)

FOREIGN PATENT DOCUMENTS

EP          2 503 754        9/2012
KR    10-2014-0140820       12/2014

OTHER PUBLICATIONS

3rd Generation Partnership Project; Technical Specification Group Services and System Aspects; 3G Security; Security Architecture (Release 11) 3GPP TS 33.102 V11.4.0, Sep. 2012, 76 pages.
(Continued)

*Primary Examiner* — Amancio Gonzalez
(74) *Attorney, Agent, or Firm* — The Farrell Law Firm, P.C.

(57)    ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method and an apparatus of a server in a communication system are provided. The method includes receiving identifier information of a user equipment (UE), obtaining, if an error is detected for a first authentication key corresponding to the identifier information, information on a second authentication key for authenticating the UE, and authenticating the UE based on the information on the second authentication key. The server includes a transceiver configured to communicate with at least one of a network
(Continued)

node and an external server, and a controller configured to receive identifier information of a UE, if an error is detected for a first authentication key corresponding to the identifier information, obtain information on a second authentication key for authenticating the UE, and authenticate the UE based on the information on the second authentication key.

20 Claims, 9 Drawing Sheets

(51) Int. Cl.
*H04W 12/04* (2009.01)
*H04L 29/06* (2006.01)

(58) Field of Classification Search
USPC .......................................................... 455/411
See application file for complete search history.

(56) References Cited

U.S. PATENT DOCUMENTS

| | | | |
|---|---|---|---|
| 2011/0208359 A1* | 8/2011 | Duchene | ................ G05B 15/02 |
| | | | 700/275 |
| 2011/0265146 A1 | 10/2011 | He | |
| 2014/0051394 A1 | 2/2014 | Grech et al. | |
| 2014/0273971 A1* | 9/2014 | Patel | ..................... H04L 63/061 |
| | | | 455/411 |

OTHER PUBLICATIONS

3rd Generation Partnership Project; Technical Specification Group Services and System Aspects; 3G Security; Security Architecture (Release 12) 3GPP TS 33.102 V12.0.0, Mar. 2014, 76 pages.
European Search Report dated Aug. 24, 2015 issued in counterpart application No. 15161068.0-1870, 11 pages.

* cited by examiner

APPARATUS AND METHOD FOR AUTHENTICATION IN WIRELESS COMMUNICATION SYSTEM

PRIORITY

This application claims priority under 35 U.S.C. §119(a) to a Korean Patent Application filed on Mar. 26, 2014 in the Korean Intellectual Property Office and assigned Serial No. 10-2014-0035355, the entire contents of which are incorporated herein by reference.

BACKGROUND

1. Field of the Invention

The present invention relates generally to authentication in a communication system, and more particularly, to authentication and key agreement for a terminal to access a network.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System." The 5G communication system is considered to be implemented in higher frequency (mmWave) bands, e.g., 60 GHz bands, so as to accomplish higher data rates. To decrease propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, Device-to-Device (D2D) communication, wireless backhaul, moving network, cooperative communication, Coordinated Multi-Points (CoMP), reception-end interference cancellation and the like. In the 5G system, hybrid FSK and QAM Modulation (FQAM) and Sliding Window Superposition Coding (SWSC) as an Advanced Coding Modulation (ACM), and Filter Bank Multi Carrier (FBMC), Non-Orthogonal Multiple Access (NOMA), and Sparse Code Multiple Access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology," "wired/wireless communication and network infrastructure," "service interface technology," and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The communication system suggests an Authentication and Key Agreement (AKA) protocol, which is a mutual authentication protocol between a Mobile Station (MS) and a network when the MS accesses the network.

Mutual authentication procedures according to the AKA protocol are described in brief below. An MS transmits its identifier information to a network for accessing the network. Then, an Authentication Center (AuC) server in the network retrieves an AKA key value mapped to the identifier information of the MS from an AuC database, and generates an authentication token based on the retrieved AKA key value. Then, the authentication token generated in the AuC is transmitted to the MS. The MS generates an authentication token based on its own AKA key value and then compares the generated authentication token and the authentication token received from the network. When the generated authentication token matches the authentication token received from the network, the MS transmits a signal indicating the authentication success to the network and thus accesses the network.

As described above, based on the AKA protocol, the MS and the AuC server share the authentication key in advance and verify whether they share the same authentication key when the MS intends to access the network. When the verification is successful, the key is agreed between the MS and the AuC server and thus a session key to be used for communication traffic security can be generated. In contrast, when the verification fails, the AKA authentication fails and the corresponding MS cannot access the network.

Thus, when the AuC server or the AuC database has an error, every MS supporting the corresponding network suffers the AKA authentication failure and thus fails in the network access.

SUMMARY

The present invention has been made to address the above-discussed problems and disadvantages, and to provide at least the advantages described below. Accordingly, an aspect of the present invention is to provide a method and an apparatus for allowing a User Equipment (UE) to access a network and to use a communication service even in a situation where an AuC server or an AuC database has an error in a mobile communication network.

Another aspect of the present invention is to provide a method and an apparatus for conducting mutual authentication using a common authentication key used for every UE when an AuC server or an AuC database has an error in a communication system.

Another aspect of the present invention is to provide a method and an apparatus for conducting mutual authentication using an Over The Air (OTA) key shared between each UE and an OTA server when an AuC server or an AuC database has an error in a communication system.

Another aspect of the present invention is to provide a method and an apparatus for conducting mutual authentication by selecting one of a common authentication key and an OTA key according to a preset policy when an AuC server or an AuC database has an error in a communication system.

According to an aspect of the present invention, a method of a server in a communication system is provided. The method includes receiving identifier information of a User Equipment (UE); obtaining, if an error is detected for a first authentication key corresponding to the identifier information, information on a second authentication key for authenticating the UE; and authenticating the UE based on the information on the second authentication key.

According to another aspect of the present invention, a method of a network node in a communication system is provided. The method includes transmitting an authentication information request message including identifier information of a UE to an authentication server; obtaining, if an error is detected for a first authentication key from the authentication server, information on a second authentication key for authenticating the UE; and authenticating the UE based on the information on the second authentication key.

According to another aspect of the present invention, a method of a UE in a communication system is provided. The method includes transmitting identifier information of the UE to a network node for accessing a network; receiving an authentication token including information on a type of an authentication key from the network node; generating an authentication token based on an authentication key corresponding to the type of the authentication key among a plurality of authentication keys stored in the UE; and determining whether an authentication is successful by comparing the received authentication token and the generated authentication token.

According to another aspect of the present invention, an apparatus of a server in a communication system is provided. The apparatus includes a transceiver configured to communicate with at least one of a network node and an external server; and a controller configured to receive identifier information of a UE, obtain information on a second authentication key for authenticating the UE if an error is detected for a first authentication key corresponding to the identifier information, and authenticate the UE based on the information on the second authentication key.

According to another aspect of the present invention, an apparatus of a network node in a communication system is provided. The apparatus includes a transceiver configured to communicate with at least one of an authentication server, another network node, and an external server; and a controller configured to transmit an authentication information request message including identifier information of a UE to the authentication server, obtain information on a second authentication key for authenticating the UE if an error is detected for a first authentication key from the authentication server, and authenticate the UE based on the information on the second authentication key.

According to another aspect of the present invention, an apparatus of a UE in a communication system is provided. The apparatus includes a transceiver configured to communicate with a network node; and a subscriber identity module configured to transmit identifier information of the UE to the network node for accessing a network, generate an authentication token based on an authentication key corresponding to a type of the authentication key among a plurality of authentication keys stored in the UE if the authentication token is received including information on the type of the authentication key from the network node, and determine whether an authentication is successful by comparing the received authentication token and the generated authentication token.

BRIEF DESCRIPTION OF THE DRAWINGS

The above and other aspects, features, and advantages of the present invention will be more apparent from the following description, taken in conjunction with the accompanying drawings, in which.

DETAILED DESCRIPTION OF EMBODIMENTS OF THE PRESENT INVENTION

Figure 1:
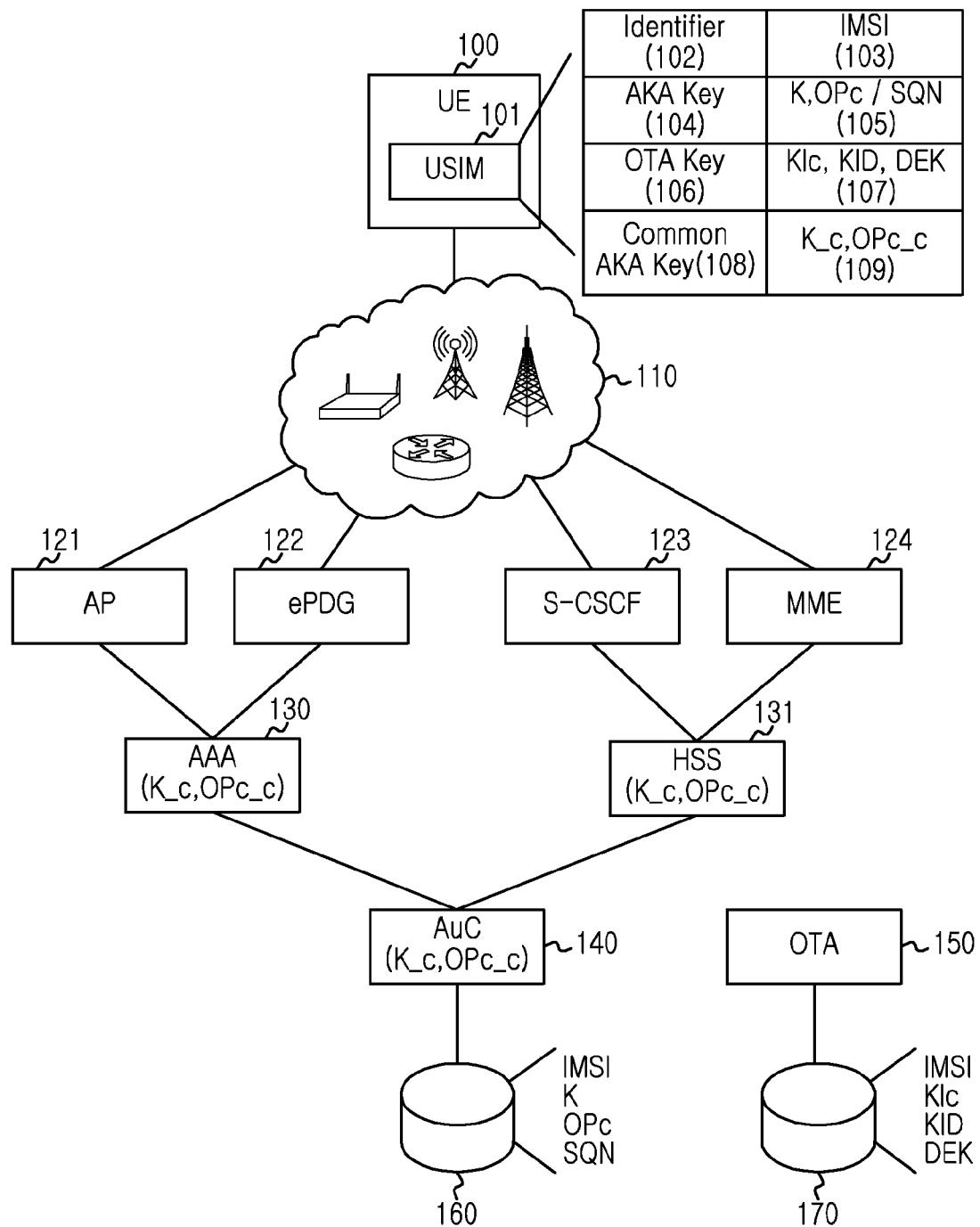
FIG. 1 is block diagram of a communication system according to an embodiment of the present invention.

The following description with reference to the accompanying drawings is provided to assist in a comprehensive understanding of embodiments of the present invention as defined by the appended claims and their equivalents. It includes various details to assist in that understanding but these are to be regarded as merely exemplary. Accordingly, those of ordinary skill in the art will recognize that various changes and modifications of the embodiments described herein can be made without departing from the scope and spirit of the present invention. In addition, descriptions of well-known functions and constructions are omitted for clarity and conciseness. Throughout the accompanying drawings, like reference numerals will be understood to refer to like parts, components and structures.

As used in the present disclosure, terms such as "includes" or "may include" refer to the presence of the corresponding function, operation or feature, and do not limit the presence of additional functions, operations or features. Also, terms such as "includes" or "has" refer to the presence of characteristics, numbers, steps, operations, components or combinations thereof, and are not intended to exclude one or more additional characteristics, numbers, steps, operations, components or combinations thereof.

As used in the present disclosure, the term "or" includes any and all combinations of terms listed. For examples, "A or B" includes only A, only B, or both A and B.

As used in the present disclosure, terms such as "first" or "second" may be used to describe various features, but do not limit such features. For example, the terms do not limit the order and/or the importance of their associated features. Such terms may be used to differentiate one feature from another. For example, a first User Equipment (alternatively, "UE") and a second user equipment are both user equipments, but are different user equipments. For example, without departing from the scope of the present invention, a first component may be referred to as a second component, and likewise, a second component may be referred to as a first component.

If a component is said to be "connected with" or "connected to" another component, the component may be directly connected with, or connected to, the other component, or another component may exist in between. In contrast, if a component is said to be "directly connected with" or "directly connected to" another component, it should be understood that no components exist in between.

As used in the present disclosure, without limitation, the phrase "configured to" may be interchangeably used with other phrases, such as "suitable for," "having the capacity to," "designed to," "adapted to," "made to," or "capable of," depending on the circumstances. In describing certain embodiments of the present invention, the term "configured to" may not necessarily indicate "specifically designed to" in a hardware sense. Rather, in a certain context, the term "configured to" may indicate "capable of" with assistance of other components. For example, the phrase "a processor configured to perform A, B, and C" can refer to a general-purpose processor (for example, a Central Processing Unit (CPU) or an application processor) that can perform A, B, and C by executing one or more software programs stored in a memory device.

The term "substantially" indicates that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide.

Unless defined otherwise, all terms used herein have the same meaning as commonly understood by those skilled in the art. Such terms as those defined in a generally used dictionary are to be interpreted to have the meanings equal to the contextual meanings in the relevant field of art, and are not to be interpreted to have ideal or excessively formal meanings unless clearly defined in the present invention.

A wireless communication system according to the present invention includes a plurality of Base Stations (BSs). Each BS provides a communication service over a particular geographical area (e.g., typically referred to as a cell). The cell can be divided into a plurality of subareas (or sectors).

A User Equipment (UE) can be stationary or mobile. The UE can be referred to as a Mobile Station (MS), a Mobile Terminal (MT), a User Terminal (UT), a Subscriber Station (SS), a wireless device, a Personal Digital Assistant (PDA), a wireless modem, a handheld device, and the like.

A BS typically indicates a fixed station for communicating with a UE, and can be referred to as an evolved-NodeB (eNB), a Base Transceiver System (BTS), an Access Point (AP), and the like. A cell should be construed extensively to include part of BS coverage, and embraces various coverage such as a mega cell, a macro cell, a micro cell, a pico cell, and a femto cell.

Hereinafter, embodiments of the present invention provide a method and an apparatus for conducting mutual authentication between a UE and a network when an Authentication Center (AuC) server or an AuC database has an error in a communication system.

FIG. 1 is a block diagram of a communication system according to an embodiment of the present invention.

Referring to FIG. 1, a UE 100 obtains its identifier information 102 from its Universal Subscriber Identity Module (USIM) 101 for network access, and transmits the obtained identity information to a network. The USIM 101 can include the identifier information 102 of the UE 100 and different authentication keys 104, 106, and 108. For example, the USIM 101 can include International Mobile Station Identity (IMSI) 103 being the identifier information 102 of the UE 100, and an Authentication and Key Agreement (AKA) key 104, an Over The Air (OTA) key 106, and a common AKA key 108, which are the authentication keys. The AKA key 104 and the OTA key 106 have different values for different USIMs, and the common AKA key 108 has the same value for every USIM. For example, different UEs has different AKA keys 104 and different OTA keys 106, but have the same common AKA key 108. The AKA key 104 includes two key values (e.g., K and OPc 105), and the OTA key 106 includes three key values (e.g., KIc, KID, and DEK 107). The common AKA key 108 includes two key values (e.g., K_c and OPc_c 109). The identifier information 102, the AKA key 104, the OTA key 106, and the common AKA key 108 can be stored when the USIM 101 is manufactured. The common AKA key 108 registered in every USIM can be updated, if necessary, using an OTA 150.

Then, the UE 100 receives an AUthentication TokeN (AUTN) from a network 110. The USIM 101 of the UE 100 confirms an authentication key type used to generate an authentication vector in the AUTN and uses the authentication key corresponding to the confirmed authentication key type. For example, when the authentication key type confirmed in the AUTN indicates the common AKA key, the USIM 101 uses the common AKA key 108 among the authentication keys stored therein. When the confirmed authentication key type indicates the OTA key, the USIM 101 uses the OTA key 106 among the authentication keys stored therein. The USIM 101 of the UE 100 generates an AUTN based on the authentication key corresponding to the authentication key type from the AUTN received from the network 110, determines whether the authentication is successful by comparing the generated AUTN with the received AUTN, and transmits a signal indicating the authentication success or failure to the network 110. In addition, the USIM 101 of the UE 100 determines based on a preset policy whether the corresponding authentication key type is available. When the corresponding authentication key type is unavailable, the USIM 101 transmits a signal indicating an authentication failure to the network 110 without generating an AUTN.

First network nodes 121 through 124 receive the identifier information from the USIM 101 of the UE 100 and forward the identifier information of the UE 100 to second network nodes 130 and 131 being higher network nodes. In this case, the identifier information of the UE can indicate the identifier information 102 of the USIM 101 of the UE 100. The first network nodes 121 through 124 include one of an AP 121, an enhanced Packet Data Gateway (ePDG) 122, a Serving-Call State Control Function (S-CSCF) 123, and a Mobility Management Entity (MME) 124. The first network nodes 121 through 124 forward the AUTN from the second network nodes 130 and 131 to the UE 100.

The second network nodes 130 and 131 receive the identifier information of the UE 100 which intends to access the network from the first network nodes 121 through 124 and request authentication information by transmitting the identifier information of the UE 100 to an AuC server 140. The second network nodes 130 and 131 include one of an Authentication, Authorization, and Accounting (AAA)

server 130 and a Home Subscriber Server (HSS) 131. The second network nodes 130 and 131 receive the authentication vector including the AUTN from the AuC server 140 and forward the received AUTN to the first network nodes 121 through 124. When detecting an error of the AuC server 130, the second network nodes 130 and 131 generate the AUTN and/or the authentication vector using a prestored common AKA key (e.g., K_c, OPc_c). For example, when not receiving the AUTN corresponding to the identifier information from the AuC server 130, the second network nodes 130 and 131 detect the error of the AuC server 130. The common AKA key has the same value as the common AKA key 108 stored in the USIM 101 of every UE 100 capable of accessing the corresponding operator network. When detecting an error of the AuC server 130, the second network nodes 130 and 131 obtain an OTA key from the OTA server 150 and generate the AUTN and/or the authentication vector using the obtained OTA key. Herein, the OTA key can have a different value according to the identifier information of the UE 100.

The AuC server 140 receives the identifier information of the UE 100 for accessing the network from the second network nodes 130 and 131, and retrieves the AKA key corresponding to the received identifier information from a database connected to the AuC server 140 or a database of the AuC server 140. The database of the AuC server 140 stores the AKA key corresponding to the IMSI 103 of the subscribed UE 100 when the UE 100 subscribes to the corresponding network. When successfully retrieving the AKA key, the AuC server 140 generates an authentication vector including the AUTN using the retrieved AKA key and transmits the generated authentication vector to the second network nodes 130 and 131. In contrast, when unsuccessfully retrieving the AKA key because of a database error, the AuC server 140 determines the authentication key type to be used for the UE authentication based on an operator policy and generates an authentication vector using the determined authentication key type. For example, when detecting a database error, the AuC server 140 generates an authentication vector by obtaining an OTA key from the OTA server 150 according to an operator policy, and generates the authentication vector using the common AKA key (e.g., K_c, OPc_c) prestored in the AuC server 140. In addition, the AuC server 140 generates the AUTN including authentication key type information used to generate the authentication vector.

Signal flows for mutual authentication in the case of an AuC database error are described below with reference to FIG. 2A, and signal flows for mutual authentication in the case of an AuC server error are described below with reference to FIG. 2B. To facilitate understanding, it is assumed that the first network node is the MME 124 and 204 and the second network node is the HSS 131 and 206 in FIG. 2A and FIG. 2B. Notably, the signal flows described below can be applied identically to the first network node being one of the AP 121, the ePDG 122, the S-CSCF 123, and the MME 124 and 204 and to the second network node being one of the AAA 130 and the HSS 131 and 206. Hereafter, message names are mere examples to facilitate understanding and accordingly other messages can be adopted according to architecture.

Figure 2A:
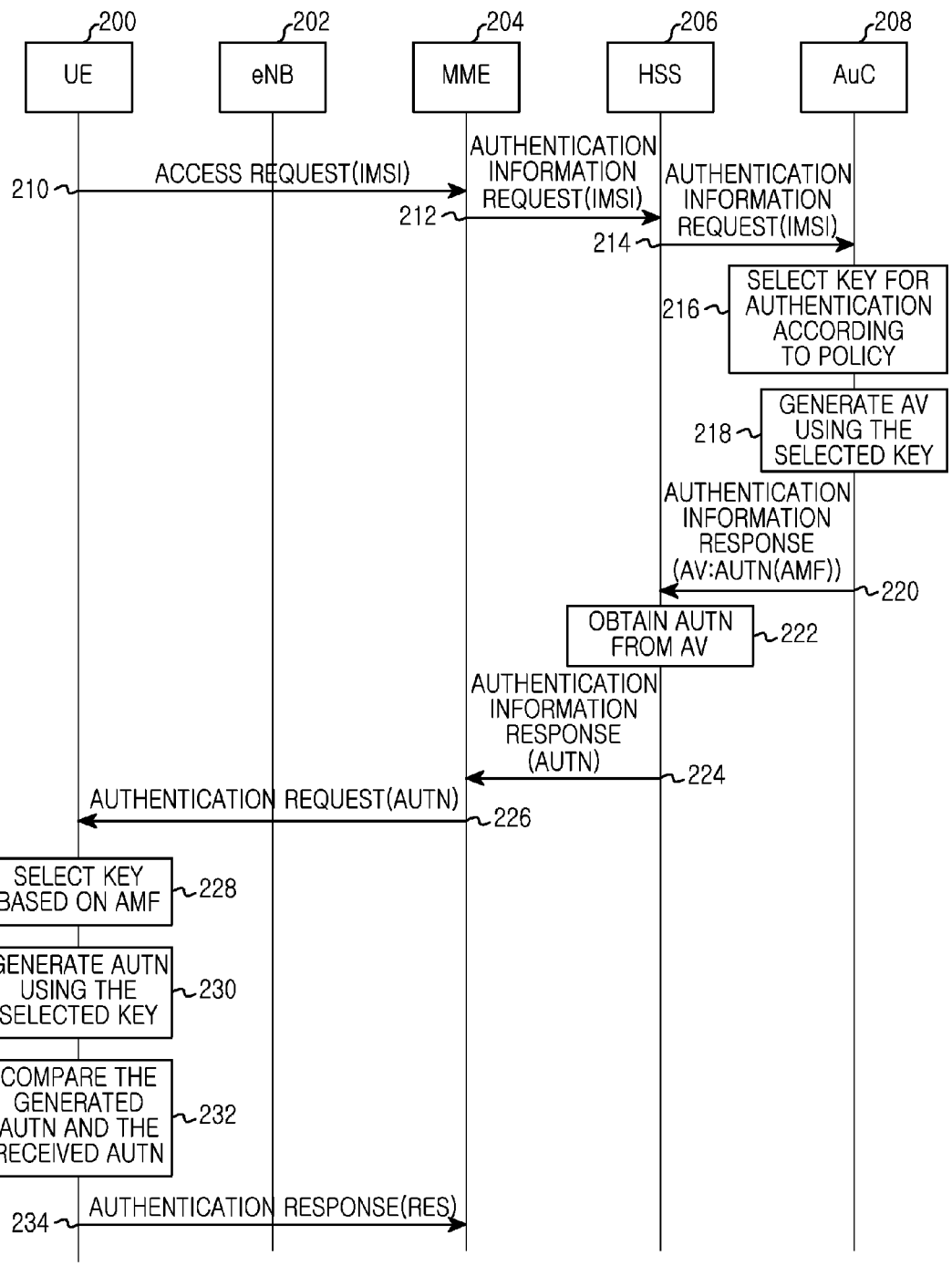
FIG. 2A is a signal flow diagram for mutual authentication between a User Equipment (UE) and a network according to an embodiment of the present invention.

FIG. 2A is a signal diagram for mutual authentication between a UE and a network according to an embodiment of the present invention.

Referring to FIG. 2A, for an initial access to the network, a UE 200 transmits an access request message including an IMSI being its identifier information to the MME 204 via an eNB 202 in step 210.

In step 212, the MME 204 extracts the IMSI from the access request message received from the UE 200 and transmits an authentication information request message including the extracted IMSI to the HSS 206. Upon receiving the authentication information request message including the IMSI from the MME 204, the HSS 206 forwards the authentication information request message including the IMSI to an AuC server 208 in step 214.

The AuC server 208, having received the authentication information request message including the IMSI from the MME 204, retrieves an AKA key corresponding to the IMSI from the AuC database. Herein, it is assumed that the AuC database suffers an error and the AKA key corresponding to the IMSI is not retrieved from the AuC database.

When the AKA key is not retrieved due to an AuC database error, the AuC server 208 selects a key for authenticating the UE 200 based on a preset operator policy in step 216 and generates an Authentication Vector (AV) using the selected key in step 218. For example, when the operator policy states to use the common AKA key in the case of an AuC database error, the AuC server 208 obtains the common AKA key from its storage device and generates the AV using the obtained common AKA key. In so doing, the AV is generated as defined by an AKA protocol. In the present invention, the AV includes the AUTN and the AUTN includes an Authentication Management Field (AMF) including the authentication key type information for generating the AV. For example, the authentication key type information can be expressed using a particular bit of the AMF as shown in Table 1 below.

Table 1 below shows AMF field bits used as defined by an AKA protocol.

TABLE 1

| AMF bit | description |
| --- | --- |
| 0 | AMF separation bit for Evolved Packet System (EPS) |
| 1-7 | Reserved for Future Use (RFU) |
| 8-15 | Proprietary |
| 14-15 | 00: AKA key, 01: common AKA key, 10: OTA key, 00: reserved |

As shown in Table 1 above, bits 8 to 15 of the 16 bits of the current AMF field are used by the operator. Hence, two (e.g., bits 14 and 15) of the bits usable by the current operator represent which authentication key is used to generate the AV in the present invention. For example, the AKA key is indicated by setting the two bits defined by the operator to "00," the common AKA key, can be indicated by setting the two bits defined by the operator to "01," and the OTA key can be indicated by setting the two bits defined by the operator to "10." Although the two bits are used to represent the authentication key type for generating the AV, the number of the bits for representing the authentication key type can vary according to the architecture. For example, for a plurality of OTA keys (first through 15$^{th}$ OTA keys), some of AMF bits 8 to 15 may be used to indicate which one of the OTA keys is used. Likewise, for a plurality of common AKA keys (first through 15$^{th}$ AKA keys), some of AMF bits 8 to 15 may be used to indicate which one of the common AKA keys is used.

In step 220, the AuC server 208 transmits an authentication information response message including the AV to the HSS 206. The HSS 206 obtains the AUTN from the AV of the authentication information response message in step 222. The HHS 206 forwards the authentication information response message including the AUTN to the MME 204 in step 224. The MME 204 transmits an authentication request message including the AUTN to the UE 200 via the eNB 202 in step 226.

The UE 200 selects a key for the authentication based on the preset AMF bit of the AUTN received from the MME 204 in step 228 and generates an AUTN based on the selected key in step 230. That is, the UE 200 confirms the authentication key type used to generate the AV based on the preset AMF bit of the AUTN as shown in Table 1 above. For example, the UE 200 confirms that the authentication key type used to generate the AV is the AKA key for each UE when the $14^{th}$ and $15^{th}$ AMF bits are "00," where "01" indicates that the authentication key type used to generate the AV is the common AKA key, and where "10" indicates that the authentication key type used to generate the AV is the OTA key, obtains the corresponding key value from the USIM of the UE 200, and thus generates the AUTN. For example, the UE 200 obtains K and OPc from the USIM when the authentication key type used to generate the AV is the AKA key, K_c and OPc_c from the USIM when the authentication key type used to generate the AV is the common AKA key, and KIc, KID, and DEK from the USIM when the authentication key type used to generate the AV is the OTA key.

Then, the UE 200 compares the generated AUTN with the AUTN received from the MME 204 in step 232. When the generated AUTN and the received AUTN are the same, the UE 200 transmits an authentication response message indicating authentication success to the MME 204 in step 234. In contrast, when the generated AUTN and the received AUTN are not the same, the UE 200 transmits an authentication fail message indicating authentication failure to the MME 204. The MME 204 forwards the authentication response message or the authentication fail message received from the UE 200, to the HSS 206, and the HSS 206 determines based on the received message whether the mutual authentication is successful.

Figure 2B:
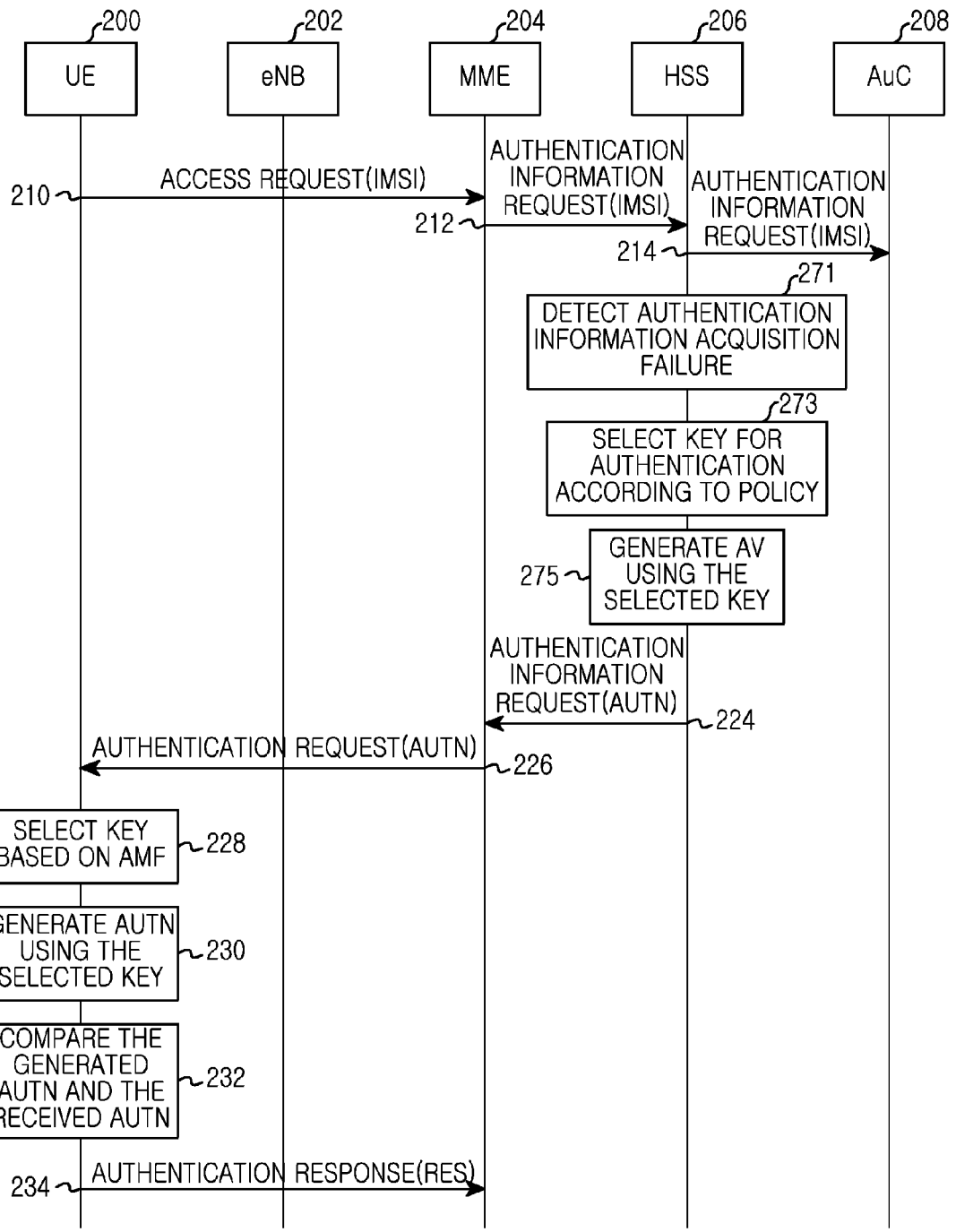
FIG. 2B is a signal flow diagram for mutual authentication between a UE and a network according to an embodiment of the present invention.

FIG. 2B is a signal flow diagram for the mutual authentication between a UE and a network according to an embodiment of the present invention.

Referring to FIG. 2B, for the initial access to the network, the UE 200 transmits an access request message including an IMSI being its identifier information to the MME 204 via the eNB 202 in step 210.

In step 212, the MME 204 extracts the IMSI from the access request message received from the UE 200 and transmits the authentication information request message including the extracted IMSI to the HSS 206. Upon receiving the authentication information request message including the IMSI from the MME 204, the HSS 206 forwards the authentication information request message including the IMSI to the AuC server 208 in step 214. Herein, it is assumed that the AuC server 208 suffers an error and the HSS 206 receives no response from the AuC 208.

When the AV is not received from the AuC server 208 due to an error of the AuC server 208, the HSS 206 detects the failure of the authentication information acquisition in step 271, selects the key for authenticating the UE 200 based on an operator policy in step 273, and generates the AV using the selected key in step 275. For example, when the operator policy states to use the common AKA key in the case of an AuC server error, the HSS 206 obtains the common AKA key from its storage device and generates the AV using the obtained common AKA key. In so doing, the AV can be generated as defined by the AKA protocol. For example, the AV includes the AUTN, and the AUTN includes the AMF including the authentication key type information used to generate the AV. For example, certain bits of the AMF can be used to represent the authentication key type information as shown in Table 1 above.

The HSS 206 forwards the authentication information response message including the AUTN to the MME 204 in step 224. The MME 204 transmits the authentication request message including the AUTN to the UE 200 via the eNB 202 in step 226.

The UE 200 selects the key to be used for the authentication based on the preset AMF bits of the AUTN received from the MME 204 in step 228 and generates the AUTN based on the selected key in step 230. That is, the UE 200 confirms the authentication key type used to generate the AV from the AUTN based on the preset AMF bits as shown in Table 1 above. For example, the UE 200 confirms that the authentication key type used to generate the AV is the AKA key for each UE when the $14^{th}$ and $15^{th}$ bits of the AMF are "00," where "01" indicates that the authentication key type used to generate the AV is the common AKA key, and where "10" indicates that the authentication key type used to generate the AV is the OTA key, obtains the corresponding key value from the USIM of the UE 200, and thus generates the AUTN. For example, the UE 200 obtains K and OPc from the USIM when the authentication key type used to generate the AV is the AKA key, K_c and OPc_c from the USIM when the authentication key type used to generate the AV is the common AKA key, and KIc, KID, and DEK from the USIM when the authentication key type used to generate the AV is the OTA key.

Then, the UE 200 compares the generated AUTN with the AUTN received from the MME 204 in step 232. When the generated AUTN and the received AUTN are the same, the UE 200 transmits an authentication response message indicating authentication success to the MME 204 in step 234. In contrast, when the generated AUTN and the received AUTN are not the same, the UE 200 transmits an authentication fail message indicating authentication failure to the MME 204. The MME 204 forwards the authentication response message or the authentication fail message received from the UE 200 to the HSS 206, and the HSS 206 determines based on the received message whether the mutual authentication is successful.

Figure 3:
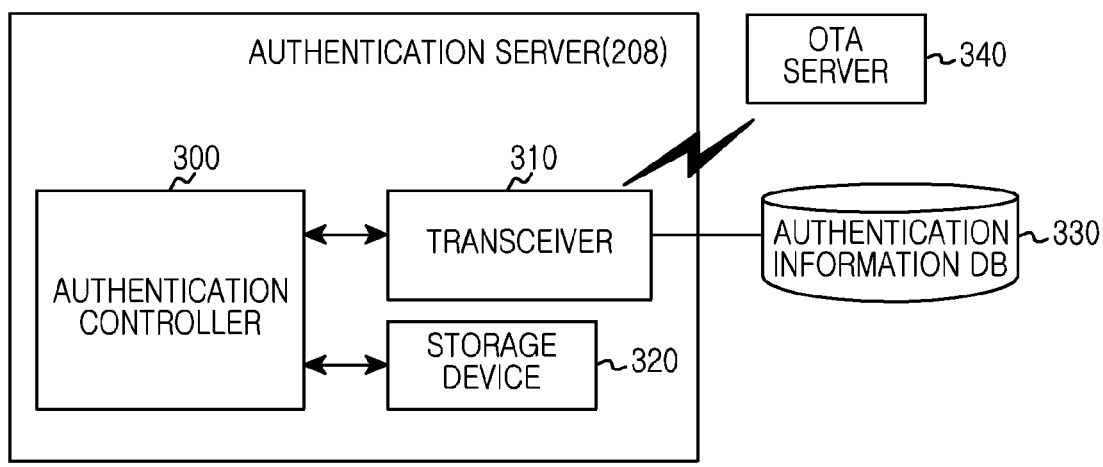
FIG. 3 is a block diagram of an authentication server according to an embodiment of the present invention.

FIG. 3 is a block diagram of an authentication server according to an embodiment of the present invention, where the authentication server is the AuC server 208.

Referring to FIG. 3, the authentication server 208 includes an authentication controller 300, a transceiver 310, and a storage device 320. The authentication server 208 is connected to an external authentication information database (DB) 330. Alternatively, the authentication information DB 330 may be included in the storage device of the authentication server 208.

The authentication controller 300 controls and processes the authentication of a UE for accessing a network. The authentication controller 300, when the identifier information of the UE for accessing the network is received from a network node (e.g., the AAA 130 or the HSS 206), controls and processes to retrieve an AKA key corresponding to the identifier information from the authentication information DB 330. When the AKA key is successfully received from the authentication information DB 330, the authentication controller 300 controls and processes to generate the AV including the AUTN using the retrieved AKA key and to transmit the generated AV to the corresponding network node.

In contrast, when the AKA key is unsuccessfully received due to an error of the authentication information DB 330, the authentication controller 300 determines the authentication key type for the UE authentication based on an operator policy and generates the AV using the authentication key of the determined type. For example, when a DB error is detected, the authentication controller 300 obtains the OTA key of the corresponding UE by communicating with an OTA server 340 according to the operator policy and generates the AV using the obtained OTA key. For example, the OTA server 340 stores the OTA key per IMSI, and the OTA key is also stored in the USIM of the UE. Thus, the AV can be generated using the OTA value defined per UE. When a DB error is detected, the authentication controller 300 generates the AV using the common AKA key (e.g., K_c and OPc_c) stored in the storage device 320 according to the operator policy. The authentication controller 300 generates the AV including the AUTN using the selected authentication key (e.g., the AKA key, the common AKA key, or the OTA key), a random number (RAND), and a sequence number (SQN).

The authentication controller 300 represents the authentication key type information used to generate the AV in some of the AMF bits, generates the AUTN including the AMF, and generates the AV including the AUTN. For example, the authentication controller 300 represents the authentication key type information used to generate the AV using some available bits defined by the operator among the AMF bits shown in Table 1 above.

The authentication controller 300 controls and processes to transmit the generated AV to the network node. The authentication controller 300 includes at least one processor. The authentication controller 300 may be referred to as "a processor," "a processing unit," and the like.

The transceiver 310 transmits and receives signals to and from the network node, the OTA server 340, and the authentication information DB 330. For example, the transceiver 310 receives the IMSI of the UE from the network node and transmits the corresponding AV. The transceiver 310 requests the OTA server 340 to transmit the OTA key corresponding to a particular IMSI and receives the OTA key from the OTA server 340. The transceiver 310 retrieves the AKA key corresponding to the IMSI from the authentication information DB 330 under the control of the authentication controller 310.

The storage device 320 stores various data and programs for operating the authentication server 208. The storage device 320 stores the common AKA key which is commonly used for all of the UEs.

The authentication information DB 330 stores the AKAs corresponding to the IMSIs of the UEs. The AKA corresponding to the IMSI of the UE is stored when the corresponding UE subscribes to the corresponding network.

Figure 4:
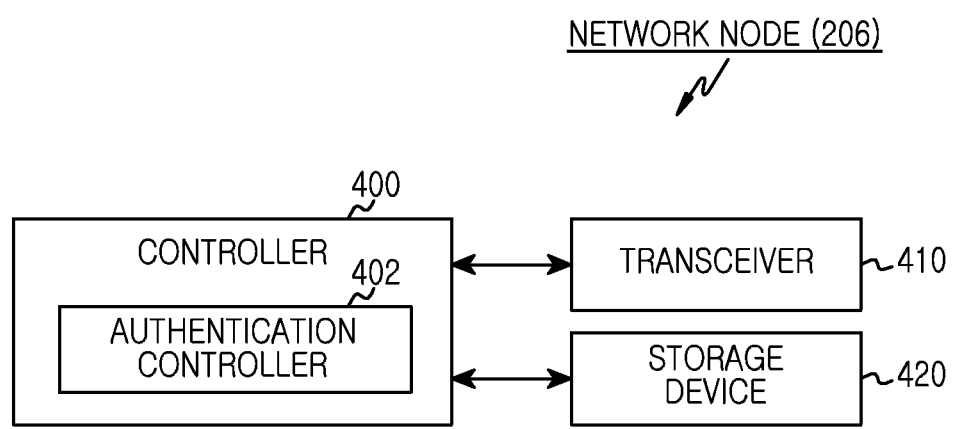
FIG. 4 is a block diagram of a network node according to an embodiment of the present invention.

FIG. 4 is a block diagram of a network node according to an embodiment of the present invention, where a network node 206 is the AAA or the HSS.

Referring to FIG. 4, the network node 206 includes a controller 400, a transceiver 410, and a storage device 420.

The controller 400 controls and processes the general operation of the network node 206. The controller 400 includes an authentication controller 402 for authenticating a UE for accessing the network. The authentication controller 402, when the identifier information of the UE for accessing the network is received from other network node (e.g., the AP, the ePDG, the S-CSCF, or the MME), controls and processes to transmit the authentication information request signal including the identifier information to the authentication server. When the AV is received from the authentication server, the authentication controller 402 controls and processes to obtain the AUTN from the AV and to transmit the AUTN to the UE via the other network node. The authentication controller 402 obtains the RAND from the AV and transmits the obtained RAND and the AUTN to the UE via the other network node. The authentication controller 402 receives the authentication response or the authentication failure signal from the UE, determines whether the mutual authentication is successful, and control and process to permit the UE to access the network when the mutual authentication is successful.

When the AV is not received due to an error of the authentication server 208, the authentication controller 402 determines the authentication key type for authenticating the UE based on the operator policy and generates the AUTN and/or the AV using the authentication key of the determined type. For example, when an authentication server error is detected, the authentication controller 402 obtains the OTA key of the corresponding UE by communicating with an OTA server 340 according to the operator policy and generates the AUTN and/or the AV using the obtained OTA key. For example, the OTA server 340 stores the OTA key per IMSI, and the OTA key is also stored in the USIM of the UE. Thus, the AUTN and/or the AV can be generated using the OTA value defined per UE. When an authentication server error is detected, the authentication controller 402 generates the AUTN and/or the AV using the common AKA key (e.g., K_c and OPc_c) prestored in the storage device 420 according to the operator policy. The authentication controller 402 generates the AV including the AUTN using the selected authentication key (e.g., the common ATA key or the OTA key), the RAND, and the SQN.

The authentication controller 402 represents the authentication key type information used to generate the AV in some of the AMF bits, generates the AUTN including the AMF marking the authentication key type information, and generates the AV including the AUTN. For example, the authentication controller 402 represents the authentication key type information used to generate the AV using some available bits defined by the operator among the AMF bits as shown in Table 1 above.

The authentication controller 402 controls and processes to transmit the generated AUTN to the other network node.

The transceiver 410 transmits and receives signals to and from the other network node, the authentication server, and the OTA server. For example, the transceiver 410 receives the IMSI of the UE from the other network node under the control of the authentication controller 402, transmits the received IMSI to the authentication server, and receives the AV corresponding to the IMSI from the authentication server. The transceiver 410 transmits the AUTN to the UE via the other network node and receives the authentication response signal from the UE. The transceiver 410 requests the OTA server 340 to transmit the OTA key corresponding to a particular IMSI and receives the OTA key from the OTA server 340.

The storage device 420 stores various data and programs for operating the corresponding network node 206. The storage device 420 stores the common AKA key which is commonly used for all of the UEs.

Figure 5:
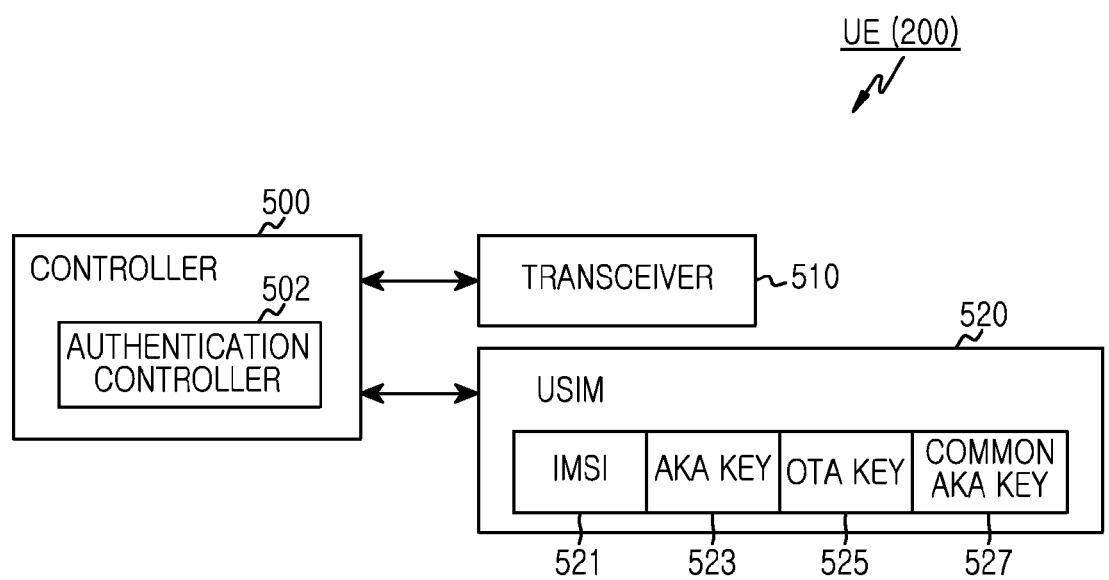
FIG. 5 is a block diagram of a UE according to an embodiment of the present invention.

FIG. 5 is a block diagram of a UE according to an embodiment of the present invention.

Referring to FIG. 5, the UE 200 includes a controller 500, a transceiver 510, and a USIM 520.

The controller 500 controls and processes the operations of the UE 200. The controller 500 includes an authentication controller 502 for controlling and processing mutual authentication with a network for accessing the network. That is, the authentication controller 502 obtains the UE identifier information (e.g., the IMSI 521) from the USIM 520 of the UE 200 and transmits the obtained identifier information to the network. The authentication controller 502 controls the USIM 520 to conduct the authentication by receiving a message including an AUTN from the network and transmitting the message including the received AUTN to the USIM 520. The authentication controller 502 can control and process to receive a signal indicating authentication success or failure from the USIM 520 and to forward the signal indicating authentication success or failure to the network. The controller 500 includes at least one processor. The controller 500 may be referred to as "a processor," "a processing unit," and the like.

The transceiver 510 transmits and receives signals to and from network nodes. For example, the transceiver 510 transmits the IMSI 521 of the UE 200 to a network node under the control of the authentication controller 502 and receives the AUTN corresponding to the IMSI 521 from the network node. The transceiver 510 transmits the signal indicating authentication success or failure of the UE 200.

The USIM 520 is the SIM for storing user (or subscriber) information and stores various personal information for subscriber authentication, fee charging, and security. For example, the USIM 520 includes the UE 200 identifier information (e.g., IMSI 521) and different authentication keys 523, 525, and 527. For example, the USIM 520 includes the AKA key 523, the OTA key 525, and the common AKA key 527. Herein, the AKA key 523 and the OTA key 525 differ per USIM 520 card, and the common AKA key 527 is identical to every USIM. That is, a plurality of UEs each has a different AKA key and OTA key but has the same common AKA key. Herein, the AKA key 523 includes two key values (e.g., K and OPc) and an SQN, and the OTA key 525 includes three key values (e.g., KIc, KID, and DEK). The common AKA key 527 includes two key values (e.g., K_c and OPc_c). The IMSI 521, the AKA key 523, the OTA key 525, and the common AKA key 527 can be stored during USIM manufacture. The common AKA key 527 is updated using the OTA key 525.

The USIM 520 receives a message including the AUTN received from the network through the authentication controller 502, confirms the authentication key type used to generate the AV in the AUTN, and determines the authentication key corresponding to the confirmed authentication key type. For example, when the authentication key type in the AUTN indicates the AKA key, the USIM 520 determines the AKA key 523 of the stored authentication keys as the authentication key. When the confirmed authentication key type indicates the common AKA key, the USIM 520 determines the common AKA key 527 of the stored authentication keys as the authentication key. When the confirmed authentication key type indicates the OTA key, the USIM 520 determines the OTA key 525 of the stored authentication keys as the authentication key. In addition, the USIM 520 obtains the RAND from the message including the AUTN. The USIM 520 verifies a Message Authentication Code (MAC) based on the determined authentication key and the AUTN, obtains and updates the SQN, generates the AUTN using the obtained authentication key, the RAND, and the SQN, determines whether the authentication is successful by comparing the generated AUTN with the received AUTN, and transmits the signal indicating authentication success or failure to the authentication controller 502 so as to request to forward the corresponding signal to the network. In addition, the USIM 520 determines whether the authentication key type confirmed in the AUTN is available based on a preset policy. When the authentication key type is unavailable, the USIM 520 transmits the signal indicating authentication failure to the authentication controller 502, without generating the AUTN, so as to request to forward the corresponding signal to the network.

Figure 6:
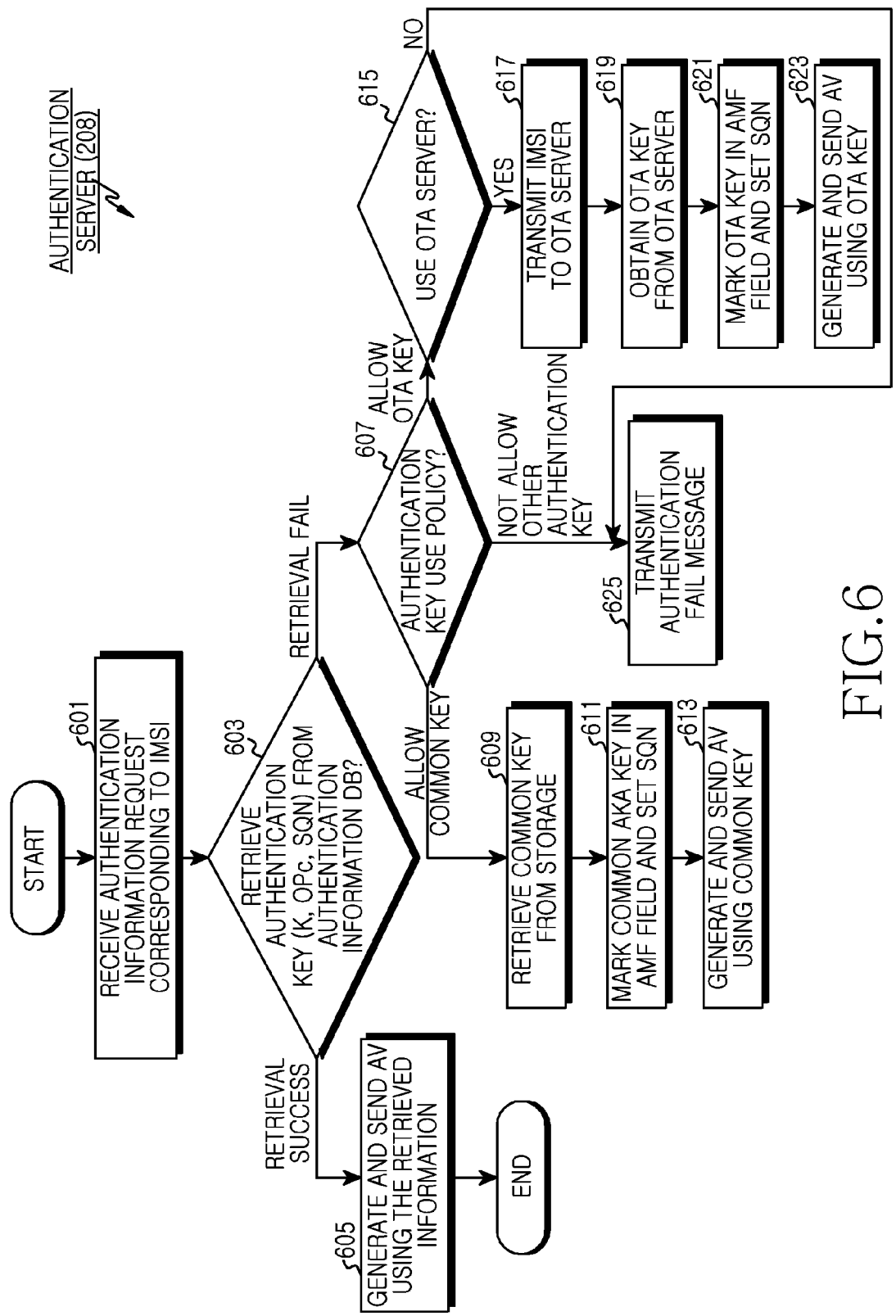
FIG. 6 is a flowchart of a method of an authentication server according to an embodiment of the present invention.

FIG. 6 is a flowchart of a method of an authentication server 208 according to an embodiment of the present invention.

Referring to FIG. 6, the authentication server 208 receives an authentication information request signal corresponding to an IMSI from a network node in step 601. In step 603, the authentication server 208 retrieves an authentication key (e.g., the AKA key (K, OPc, and SQN)) corresponding to the IMSI from an authentication information DB. When the authentication key corresponding to the IMSI is successfully retrieved from the authentication information DB, the authentication server 208 generates an AV using the retrieved authentication key and transmits the generated AV in step 605. The authentication server 208 generates the AV including the AUTN using the AKA key (K, OPc, and SQN) retrieved from the authentication information DB and the RAND. Then, the authentication server 208 terminates this process.

In contrast, when the authentication information DB has an error and the authentication key retrieval corresponding to the IMSI from the authentication information DB fails, the authentication server 208 confirms an authentication key use policy in step 607. The authentication key use policy is set and changed by an operator and/or an architect. When the authentication key use policy states to use the OTA key in response to an authentication information DB error, the authentication server 208 determines whether the OTA server 340 is usable in step 615. For example, the authentication server 208 determines whether the OTA server 340 is usable by determining whether it can communicate with the OTA server 340 or access the DB of the OTA server 340. When the OTA server 340 is not usable, the authentication server 208 transmits an authentication fail message in step 625 and terminates this process. Alternatively, when the OTA server 340 is not usable, the authentication server 208 determines to use the common AKA key based on the authentication key use policy and proceeds to step 609.

In contrast, when the OTA server 340 is usable, the authentication server 208 requests the OTA key corresponding to the IMSI by transmitting the IMSI to the OTA server 340 in step 617, and obtains the OTA key from the OTA server 340 in step 619. In step 621, the authentication server 208 marks the OTA key at the AMF bits and sets the SQN in step 621. In step 623, the authentication server 208 generates the AV using the OTA key and transmits the generated AV to the network node. The authentication server 208 generates the AV including the AUTN using the OTA key (KIc and KID), the RAND, and the SQN and transmits the generated AV to the network node. Then, the authentication server 208 terminates this process.

When the authentication key use policy states to use the common AKA key for an authentication information DB error in step 607, the authentication server 208 obtains the common AKA key from its storage device in step 609. In step 611, the authentication server 208 marks the common AKA key at the AMF bits and sets the SQN. In step 613, the authentication server 208 generates the AV using the common AKA key and transmits the generated AV to the network node. The authentication server 208 generates the AV including the AUTN using the common AKA key (K_c and OPc_c), the RAND, and the SQN. Then, the authentication server 208 terminates this process.

When the authentication key use policy does not allow another authentication key for an authentication information DB error in step 607, the authentication server 208 transmits an authentication fail message to the UE via the other network node in step 625. Then, the authentication server 208 terminates this process.

Figure 7:
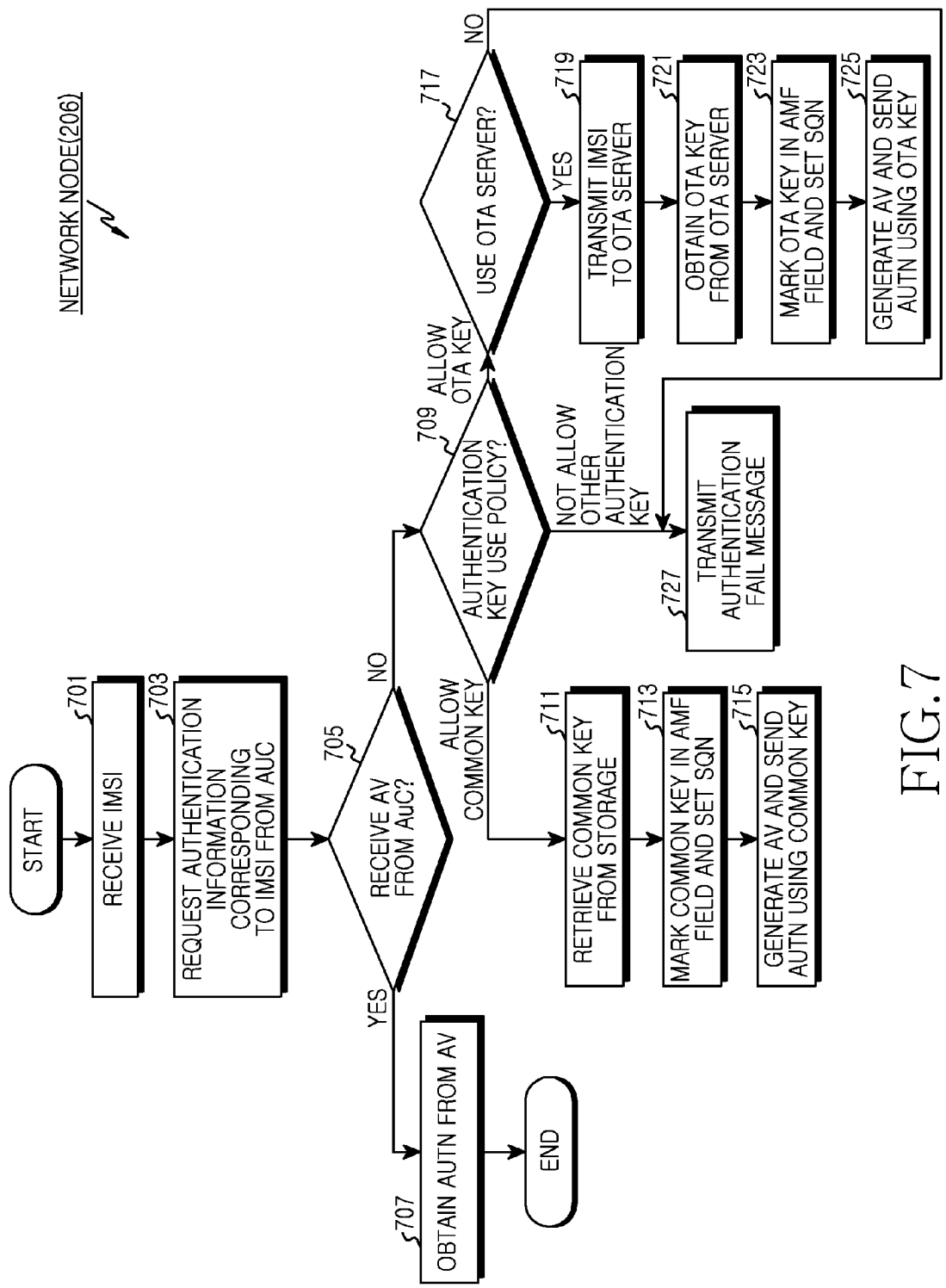
FIG. 7 is a flowchart of a method of a network node according to an embodiment of the present invention.

FIG. 7 is a flow chart of a method of a network node according to an embodiment of the present invention.

Referring to FIG. 7, a network node 206 receives a IMSI of a UE from another network node in step 701 and transmits an authentication information request signal corresponding to the IMSI to an authentication server (e.g. an AuC server) in step 703.

In step 705, the network node 206 determines whether the AV is received from the authentication server 208. Upon receiving the AV from the authentication server 208, the network node 206 obtains an AUTN from the AV in step 707 and transmits the obtained AUTN to the UE via the other network node. In so doing, the network node 206 obtains the RAND from the AV and transmits the obtained RAND to the UE. Then, the network node 206 terminates this process.

In contrast, when the AV is received from the authentication server 208 due to an error of the authentication server 208, the network node 206 confirms the authentication key use policy in step 709. The authentication key use policy can be set and changed by the operator and/or the architect. When the authentication key use policy states to use the OTA key in response to an authentication information DB error, the network node 206 determines whether the OTA server 340 is usable in step 717. For example, the network node 206 determines whether the OTA server 340 is usable by determining whether it can communicate with the OTA server 340 or access the DB of the OTA server 340. When the OTA server 340 is not usable, the network node 206 transmits an authentication fail message in step 727 and terminates this process. Alternatively, when the OTA server 340 is not usable, the network node 206 determines to use the common AKA key based on the authentication key use policy and proceeds to step 711.

When the OTA server 340 is usable, the network node 206 requests the OTA key corresponding to the IMSI by transmitting the IMSI to the OTA server 340 in step 719, and obtains the OTA key from the OTA server 340 in step 721. In step 723, the network node 206 marks the OTA key at the AMF bits and sets the SQN. In step 725, the network node 206 generates an AV including the AUTN using the OTA key and transmits the AUTN to the UE via the other network node. The network node 206 generates the AV including the AUTN using the OTA key (KIc and KID), the RAND, and the SQN and transmits the generated AUTN to the UE. Then, the network node 206 terminates this process.

When the authentication key use policy states to use the common AKA key for an authentication information DB error in step 709, the network node 206 obtains the common AKA key from its storage device in step 711. In step 713, the network node 206 marks the common AKA key at the AMF bits and sets the SQN. In step 715, the network node 206 generates an AV including the AUTN using the common AKA key and transmits the generated AUTN to the UE via the other network node. The network node 206 generates an AV including the AUTN using the common AKA key (K_c and OPc_c), the RAND, and the SQN. Then, the network node 206 terminates this process.

When the authentication key use policy does not allow another authentication key for an authentication information DB error in step 709, the network node 206 transmits an authentication fail message to the UE 200 via the other network node in step 727. Next, the network node 206 terminates this process.

Figure 8:
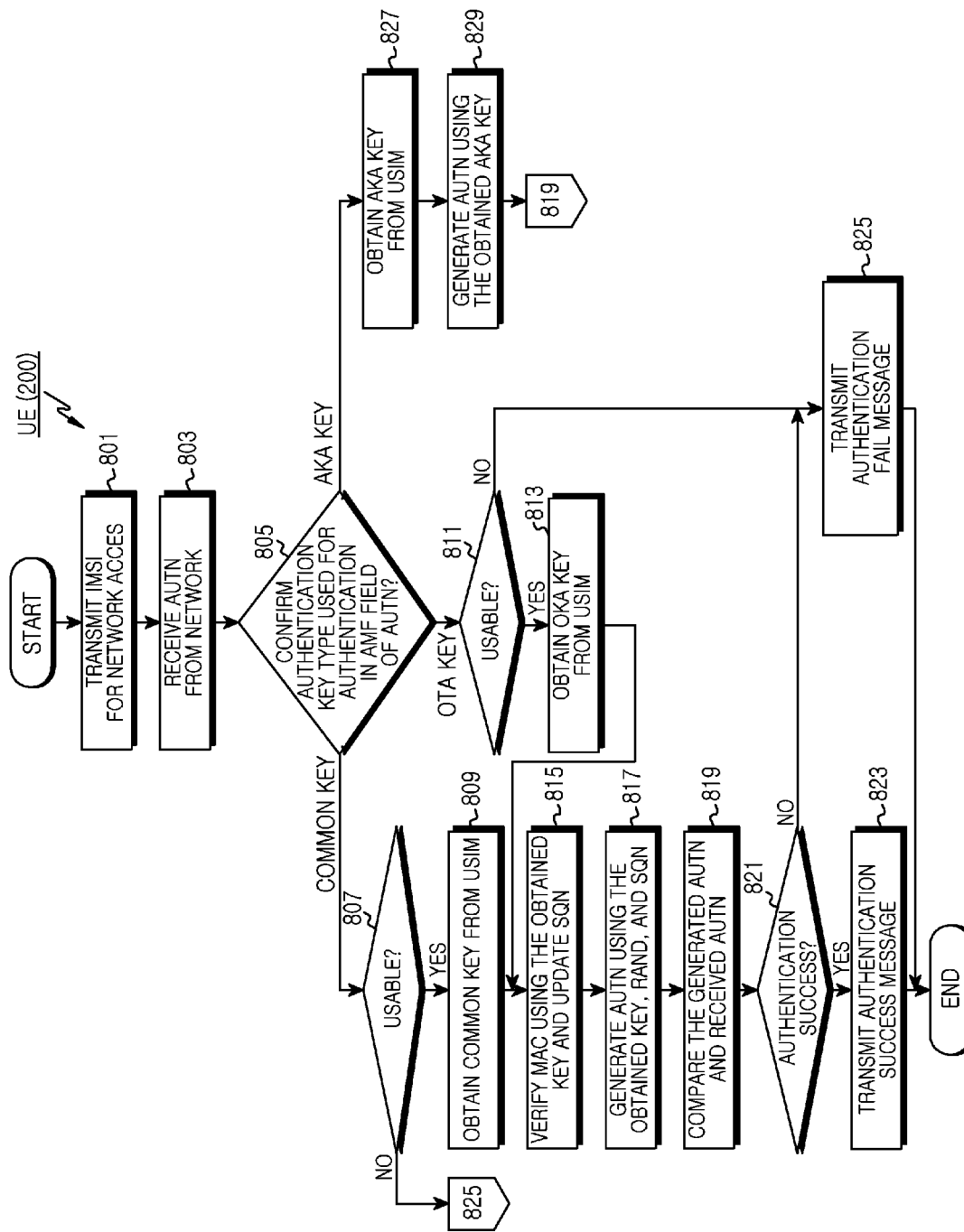
FIG. 8 is a flowchart of a method of a UE according to an embodiment of the present invention.

FIG. 8 is a flowchart of a method of a UE according to an embodiment of the present invention.

Referring to FIG. 8, the UE 200 transmits its identifier information IMSI to a network for accessing the network in step 801. In so doing, the UE 200 obtains the IMSI from the USIM.

In step 803, the UE 200 receives a message including an AUTN from a network node 206. The message including the AUTN includes at least one of a RAND and a SQN generated for the AUTN in the network.

In step 805, the UE 200 confirms an authentication key type for authentication in an AMF of the AUTN. For example, the UE 200 determines which authentication key is used to generate an AV using preset AMF bits. When the authentication key type is an AKA key, the UE 200 obtains the AKA key (K, OPC, and SQN) from the USIM in step 827, generates the AUTN using the obtained AKA key in step 829, and then proceeds to step 819.

When the authentication key type is the OTA key, the UE 200 determines whether the OTA key is usable in step 811. For example, the UE 200 determines whether a preset authentication use policy allows using the OTA key. When the OTA key is unusable, the UE 200 transmits an authentication fail message in step 825. When the OTA key is usable, the UE 200 obtains the OTA key from the USIM in step 813 and proceeds to step 815.

When the authentication key type is the common AKA key, the UE 200 determines whether the common AKA key is usable in step 807. For example, the UE 200 determines whether the preset authentication use policy allows using the common AKA key. When the common AKA key is unusable, the UE 200 transmits an authentication fail message in step 825. When the common AKA key is usable, the UE 200 obtains the common AKA key from the USIM in step 809 and proceeds to step 815.

In step 815, the UE 200 verifies a MAC using the obtained key (e.g., the OTA key or the common AKA key) and obtains and updates the SQN from the AUTN. Then, the UE 200 generates the AUTN using the obtained authentication key, the RAND, and the SQN in step 817, and compares the generated AUTN and the received AUTN in step 819. In step 821, the UE 200 determines whether the authentication is successful based on the comparison result. For example, when the generated AUTN and the received AUTN are the same, the UE 200 determines the authentication is a success. When the generated AUTN and the received AUTN are different from each other, the UE 200 determines the authentication is a failure.

When the authentication is determined to be a success, the UE 200 transmits an authentication response message indicating the authentication is a success in step 823. When determining the authentication is a failure, the UE 200 transmits an authentication fail message indicating the authentication is a failure in step 825.

Then, the UE 200 finishes this process.

As set forth above, when the AuC server or the AuC DB suffers an error in the communication system, mutual authentication is achieved using the common authentication key used for every UE or the OTA key per UE. Therefore, the UE can access the network and normally use the communication service in an abnormal situation with the AuC server or AuC database error.

The present operations can be achieved using a single controller. In this case, program instructions realized by various computers can be recorded in a non-transitory computer-readable recording medium. The non-transitory computer-readable recording medium can include, alone or in combination, the program instructions, data files, data structures, and the like. The program instructions may be designed and constructed especially for the implementations of the present invention or well known to those skilled in the art. Examples of a non-transitory computer-readable storage medium include magnetic media such as hard disks, floppy disks, and magnetic tape; optical media such as Compact Disc (CD) Read Only Memory (ROM) disks and Digital Versatile Discs (DVDs); magneto-optical media such as floptical disks; and hardware devices specially configured to store and execute the program instructions, such as ROM, Random Access Memory (RAM), flash memory, and the like. Examples of program instructions include machine code produced by a compiler, and high-level language code executed by the computer using an interpreter. When all or part of a base station or a relay is implemented as a computer program, the present invention can include the non-transitory computer-readable recording medium storing the computer program.

While the invention has been shown and described with reference to certain embodiments thereof, it will be understood by those skilled in the art that various changes in form and details may be made therein without departing from the scope and spirit of the present invention as defined by the appended claims and their equivalents.

What is claimed is:

1. A method for operating a server in a communication system, comprising:
   receiving, from a user identifier (UE), information regarding an identifier of the UE;
   if a key corresponding to the identifier is not detected in a storage device of the server, determining another key among a plurality of keys based on a policy; and
   transmitting, to the UE, a token comprising information for indicating a type of the another key for assisting the key,
   wherein the plurality of keys comprises a first key shared among at least the UE, one other UE, and the server.

2. The method of claim 1, wherein the plurality of keys further comprises a second key shared between the UE and another server,
   wherein the another server is an over the air (OTA) server for an OTA service,
   wherein the type of the another key indicates that the first key or the second key is used to authenticate the UE as the another key, and
   wherein the policy is set by an operator of a network.

3. The method of claim 1, wherein transmitting the token comprises:
   generating the token;
   generating an authentication vector comprising the token; and
   transmitting the generated authentication vector to a network node,
   wherein the token is transmitted from the network node to the UE.

4. The method of claim 1, wherein the information for indicating the type of the another key indicates the type of the another key based on at least one bit of an authentication management field (AMF) of the token.

5. A method for operating a network node in a communication system, comprising:
   receiving, from a user equipment (UE), information regarding an identifier of the UE;
   transmitting, to a server, the information regarding the identifier;
   if a response for the information regarding the identifier is not received from the server, determining a key among a plurality of keys based on a policy;
   transmitting, to the UE, a token comprising information for indicating a type of the key; and
   receiving, from the UE, a message indicating whether an authentication for accessing a network is successful in response to transmission of the token,
   wherein the plurality of keys comprises a first key shared among at least the UE, one other UE, and the network node.

6. The method of claim 5, wherein the plurality of keys further comprises a second key shared between the UE and another server,
   wherein the another server is an over the air (OTA) server for an OTA service,
   wherein the type of the another key indicates that the first key or the second key is used to authenticate the UE as the key, and
   wherein the policy is set by an operator of the network.

7. The method of claim 5, wherein transmitting the token comprises:
   generating the token; and
   transmitting the generated token to the UE,
   wherein the information for indicating the type of the key indicates the type of the key based on at least one bit of an authentication management field (AMF) of the token.

8. A method of a user equipment (UE) in a communication system, comprising:
   transmitting, to a network node, information regarding an identifier of the UE for accessing a network;
   receiving, from the network node, a first token comprising information for indicating a type of a key, the key determined among a plurality of keys;
   generating a second token based on an authentication key corresponding to the type of the key;
   determining whether an authentication for accessing the network is successful or not based on whether the received first token corresponds to the generated second token by using a policy; and
   transmitting a message indicating whether the authentication is successful or not,
   wherein the plurality of keys comprises a first key shared among at least the UE, one other UE, a server for the authentication, and the network node.

9. The method of claim 8, wherein the plurality of keys further comprises a second key shared between the user equipment and another server,
   wherein the another server is an over the air (OTA) server for an OTA service,
   wherein the type of the another key indicates that the first key or the second key is used to authenticate the UE as the another key, and
   wherein the policy is set by an operator of the network.

10. The method of claim 8, wherein the information for indicating the type of the key indicates the type of the key based on at least one bit of an authentication management field (AMF) of the first token, wherein the key is different from another key corresponding the identifier.

11. An apparatus of a server in a communication system, comprising:
a transceiver; and
a controller operatively coupled to the transceiver,
wherein the controller is configured to:
receive, from a user equipment (UE), information regarding an identifier of UE;
if a key corresponding the identifier is not detected in a storage device of the server, determine another key among a plurality of keys based on a policy; and
transmit, to the UE, a token comprising information for indicating a type of the another key for assisting the key,
wherein the plurality of keys comprises a first key shared among at least the UE, one other UE, and the server.

12. The apparatus of claim 11, wherein the plurality of keys further comprises a second key shared between the UE and another server,
wherein the another server is an over the air (OTA) server for an OTA service,
wherein the type of the another key indicates that the first key or the second key is used to authenticate the UE as the another key, and
wherein the policy is set by an operator of a network.

13. The apparatus of claim 11, wherein the controller is configured to:
generate the token;
generate an authentication vector comprising the authentication token; and
transmit the generated authentication vector to a network node,
wherein the token is transmitted from the network node to the UE.

14. The apparatus of claim 11, wherein the information for indicating the type of the another key indicates the type of the another key based on at least one bit of an authentication management field (AMF) of the token.

15. An apparatus of a network node in a communication system, comprising:
a transceiver; and
a controller operatively coupled to the transceiver,
wherein the controller is configured to:
receive, from a user equipment (UE), information regarding an identifier of the UE,
transmit, to a server, the information regarding the identifier;
if a response for the information regarding the identifier is not received from the server, determine a key among a plurality of keys based on a policy; and
transmit, to the UE, a token comprising information for indicating a type of the key; and
receive, from the UE, a message indicating whether an authentication for accessing a network is successful in response to transmission of the token,
wherein the plurality of keys comprises a first key shared among at least the UE, one other UE, and the network node.

16. The apparatus of claim 15, wherein the plurality of keys further comprises a second key shared between the UE and another server,
wherein the another server is an over the air (OTA) server for an OTA service,
wherein the type of the another key indicates that the first key or the second key is used to authenticate the UE as the key, and
wherein the policy is set by an operator of the network.

17. The apparatus of claim 15, wherein the controller is configured to
generate the token;
transmit the generated token to the UE, and
wherein the information for indicating the type of the key indicates the type of the key based on at least one bit of an authentication management field (AMF) of the token.

18. An apparatus of a user equipment (UE) in a communication system, comprising:
a transceiver; and
a controller operatively coupled to the transceiver,
wherein the transceiver is configured to
transmit, to a network node, information regarding an identifier of the UE for accessing a network;
receive, from the network node, a first token comprising information indicating a type of a key, the key determined among a plurality of keys;
generate a second token based on an authentication key corresponding to a type of the key;
determine whether an authentication for accessing the network is successful or not based on whether the received first token and the generated second token by using a policy; and
transmit a message indicating whether the authentication is successful or not,
wherein the plurality of keys comprises a first key shared among at least the UE, one other UE, a server for the authentication, and the network node.

19. The apparatus of claim 18, wherein the plurality of keys further comprises a second key shared between the user equipment and another server,
wherein the another server is an over the air (OTA) server for an OTA service,
wherein the type of the another key indicates that the first key or the second key is used to authenticate the UE as the another key, and
wherein the policy is set by an operator of the network.

20. The apparatus of claim 18, wherein the information for indicating the type of the key indicates the type of the key based on at least one bit of an authentication management field (AMF) of the first token,
wherein the key is different from another key corresponding the identifier.

* * * * *